US012809293B2

(12) United States Patent
Kitabayashi et al.

(10) Patent No.: US 12,809,293 B2
(45) Date of Patent: Nov. 24, 2026

(54) HEATER, FIXING DEVICE, AND IMAGE FORMING APPARATUS

(71) Applicant: KYOCERA Document Solutions Inc., Osaka (JP)

(72) Inventors: Yuta Kitabayashi, Osaka (JP); Takashi Eiki, Osaka (JP); Ryohei Tokunaga, Osaka (JP); Shunsaku Fujii, Osaka (JP); Hiroki Kawasaki, Osaka (JP); Rina Kikugawa, Osaka (JP); Tei To, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/852,327

(22) PCT Filed: Mar. 20, 2023

(86) PCT No.: PCT/JP2023/010841

§ 371 (c)(1),
(2) Date: Sep. 27, 2024

(87) PCT Pub. No.: WO2023/189808

PCT Pub. Date: Oct. 5, 2023

(65) Prior Publication Data

US 2025/0208547 A1 Jun. 26, 2025

(30) Foreign Application Priority Data

Mar. 30, 2022 (JP) ................................ 2022-055158

(51) Int. Cl.
*G03G 15/00* (2006.01)
*G03G 15/20* (2006.01)

(52) U.S. Cl.
CPC ..... *G03G 15/2053* (2013.01); *G03G 15/2064* (2013.01)

(58) Field of Classification Search
None
See application file for complete search history.

(56) References Cited

U.S. PATENT DOCUMENTS

2017/0075269 A1 3/2017 Iwasaki et al.
2017/0364001 A1* 12/2017 Takagi ............... G03G 15/2053
(Continued)

FOREIGN PATENT DOCUMENTS

JP 2017059327 A 3/2017
JP 2017228525 A 12/2017

*Primary Examiner* — Sevan A Aydin
(74) *Attorney, Agent, or Firm* — Alleman Hall LLP

(57) ABSTRACT

In order to avoid a situation where a temperature of a part of a fixing member becomes an inappropriate temperature due to variations in a size or conveying position of a sheet, a plurality of resistance blocks include a target block and an adjacent block provided next to the target block. A plurality of resistance elements of the target block include one or a plurality of end portion resistance elements and a target resistance element. The end portion resistance element is positioned at an end portion of the target block on a side of the adjacent block. The target resistance element is positioned next to the end portion resistance element. When power is supplied to the target block, a heat generation amount of the target resistance element is larger than that of the one end portion resistance element or of each of the plurality of end portion resistance elements.

5 Claims, 7 Drawing Sheets

(56) References Cited

U.S. PATENT DOCUMENTS

| | | | | |
|---|---|---|---|---|
| 2019/0056685 | A1* | 2/2019 | Eiki | G03G 15/0865 |
| 2020/0249606 | A1 | 8/2020 | Takagi et al. | |

* cited by examiner

HEATER, FIXING DEVICE, AND IMAGE FORMING APPARATUS

TECHNICAL FIELD

The present invention relates to a heater including a plurality of resistance elements, a fixing device including the heater, and an image forming apparatus including the fixing device.

BACKGROUND

An image forming apparatus that uses electrophotography includes a fixing device which heats and pressurizes a toner image transferred onto a sheet. Further, the fixing device may include a cylindrical fixing member which incorporates a heater therein and a pressure roller which forms a nip through which the sheet passes with the fixing member.

The heater heats the fixing member. In this case, a planar heater is adopted in the fixing device. The planar heater includes a plurality of resistance elements arranged in a main direction. The main direction is a direction that intersects with a conveying direction of the sheet.

In addition, in the fixing device, the plurality of resistance elements of the planar heater may be sectioned into a plurality of resistance blocks arranged in the main direction. The plurality of resistance blocks each include the plurality of resistance elements arranged in the main direction.

Further, the planar heater includes a plurality of power feed electrodes that are capable of individually supplying power to the plurality of resistance blocks, respectively.

In general, the plurality of resistance blocks are arranged at intervals larger than the intervals of the plurality of resistance elements in each of the plurality of resistance blocks. Thus, a current is prevented from leaking in a boundary region between the plurality of resistance blocks.

Meanwhile, at a portion of the fixing member that corresponds to the boundary region, there is a fear that a heating amount will become insufficient and thus a temperature requisite for fixing the toner image will not be maintained.

In addition, it is known that in each of the plurality of resistance blocks, a resistance element that is adjacent to the boundary region and is positioned at an end in the main direction has a larger heat generation amount than the other resistance elements (see, for example, Patent Literature 1). Thus, an insufficient heating amount is avoided at the portion of the fixing member that corresponds to the boundary region.

CITATION LIST

Patent Literature

Patent Literature 1: Japanese Patent Application Publication No. 2017-228525

SUMMARY

Technical Problem

Incidentally, in the planar heater of the fixing device, lengths of the plurality of resistance blocks are set according to a plurality of candidates of the size of the sheet that passes through the fixing position.

Further, a control portion of the image forming apparatus executes block selection control. In the block selection control, the control portion selects, from the plurality of resistance blocks, one or a plurality of operation blocks in accordance with the size of the sheet. In addition, the control portion controls a heater power feed circuit so that power is supplied to the selected operation block(s).

However, the sheet may not pass through an end portion of the operation block in the main direction due to variations in the size of the sheet or the conveying position of the sheet. When a heat generation amount of a specific resistance element positioned at the end portion of the operation block is large, there is a fear that a temperature of a portion of the fixing member that corresponds to the end portion of the operation block will exceed an allowable temperature.

The present invention aims at providing a heater, a fixing device, and an image forming apparatus that are capable of avoiding a situation where a temperature of a part of the fixing member becomes an inappropriate temperature due to variations in the size or conveying position of the sheet.

Solution to Problem

A heater according to an aspect of the present invention includes a plurality of resistance blocks and a plurality of power feed electrodes. The plurality of resistance blocks each include a plurality of resistance elements arranged at a first interval in a main direction. The plurality of power feed electrodes are respectively connected to one ends of the plurality of resistance blocks in a sub direction that intersects with the main direction and are capable of individually supplying power to the plurality of resistance blocks, respectively. The plurality of resistance blocks are arrayed at a second interval larger than the first interval in the main direction. The plurality of resistance blocks include a target block and an adjacent block provided next to the target block. The plurality of resistance elements of the target block include one or a plurality of end portion resistance elements positioned at an end portion of the target block on a side of the adjacent block and a target resistance element positioned next to the one or a plurality of end portion resistance elements. When power is supplied to the target block, a heat generation amount of the target resistance element is larger than a heat generation amount of the one end portion resistance element or a heat generation amount of each of the plurality of end portion resistance elements.

A fixing device according to another aspect of the present invention heats and pressurizes a toner image on a sheet at a fixing position on a conveying path of the sheet, to fix the toner image onto the sheet. The fixing device includes a support member, a fixing member, and the heater. The support member is arranged along a main direction that intersects with a sheet conveying direction at the fixing position. The fixing member is a cylindrical member which is rotatably supported by the support member. The heater is supported by the support member while being provided along the main direction and heats the fixing member.

An image forming apparatus according to another aspect of the present invention includes a transfer device which transfers a toner image onto a sheet and the fixing device.

Advantageous Effects of Invention

According to the present invention, it is possible to provide a heater, a fixing device, and an image forming apparatus that are capable of avoiding a situation where a temperature of a part of a fixing member becomes an inappropriate temperature due to variations in a size or conveying position of a sheet.

DETAILED DESCRIPTION

Hereinafter, embodiments of the present invention will be described with reference to the drawings. It is noted that the following embodiments are each an example of embodying the present invention and do not limit the technical scope of the present invention.

First Embodiment

Figure 1:
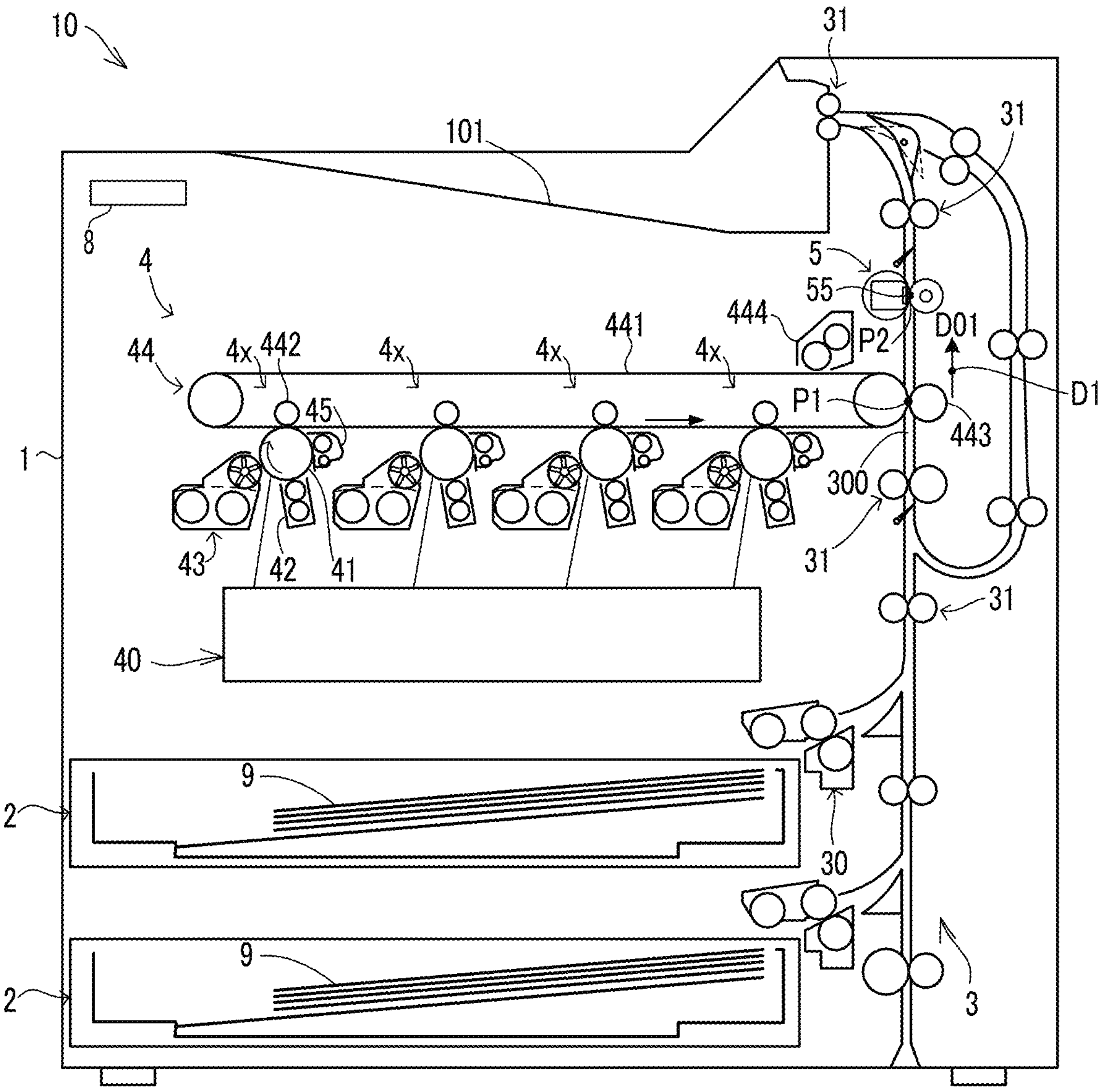
FIG. 1 is a configuration diagram of an image forming apparatus including a heater according to a first embodiment.

A heater 53 according to a first embodiment is included in a fixing device 5 of an image forming apparatus 10 (see FIG. 1).

[Configuration of Image Forming Apparatus 10]

The image forming apparatus 10 includes a printing device 4 which performs print processing for forming an image on a sheet 9.

The printing device 4 performs the print processing using electrophotography. The sheet 9 is an image forming medium such as a paper sheet or a sheet-type resin member.

As shown in FIG. 1, the image forming apparatus 10 includes a sheet conveying device 3, the printing device 4, and a control device 8 provided inside a body portion 1.

The printing device 4 includes one or more image forming devices 4*x*, a laser scanning unit 40, a transfer device 44, and the fixing device 5. The image forming device 4*x* includes a drum-type photoconductor 41, a charging device 42, a developing device 43, a drum cleaning device 45, and the like.

The sheet conveying device 3 includes a sheet feed device 30 and a plurality of conveying roller pairs 31. The sheet feed device 30 feeds the sheet 9 stored in a sheet storing portion 2 to a conveying path 300 inside the body portion 1. The conveying path 300 constitutes a path on which the sheet 9 is conveyed.

The plurality of conveying roller pairs 31 is rotationally driven by a motor (not shown). The plurality of conveying roller pairs 31 rotate to convey the sheet 9 along the conveying path 300, and further discharges the sheet 9 onto a discharge tray 101.

The sheet 9 is discharged onto the discharge tray 101 via a transfer position P1 and a fixing position P2 on the conveying path 300.

In descriptions below, a direction in which the sheet 9 is conveyed along the conveying path 300 will be referred to as a conveying direction D01. The fixing position P2 is a position on a downstream side of the conveying direction D01 with respect to the transfer position P1.

Further, a direction that intersects with the conveying direction D01 on the conveying path 300 will be referred to as a main direction D1. In the present embodiment, the main direction D1 is a direction orthogonal to the conveying direction D01.

The printing device 4 forms a toner image on the sheet 9 conveyed along the conveying path 300. The toner image is a developer image that uses toner as developer. The toner is an example of granular developer.

The image forming apparatus 10 shown in FIG. 1 is a tandem-type color image forming apparatus. Therefore, the printing device 4 includes four image forming devices 4*x* respectively corresponding to the toner of four colors of yellow, cyan, magenta, and black.

In the image forming device 4*x*, the photoconductor 41 rotates, and the charging device 42 charges a surface of the photoconductor 41. Further, the laser scanning unit 40 scans laser light to write an electrostatic latent image on the surface of the photoconductor 41.

Furthermore, the developing device 43 supplies the toner to the surface of the photoconductor 41 to develop the electrostatic latent image into the toner image. The photoconductor 41 is an example of an image-carrying member which rotates while carrying the toner image.

The transfer device 44 transfers the toner image onto the sheet 9 at the transfer position P1 on the conveying path 300. The transfer device 44 includes an intermediate transfer belt 441, four primary transfer devices 442 respectively corresponding to the four image forming devices 4*x*, a secondary transfer device 443, and a belt cleaning device 444.

In the transfer device 44, the primary transfer device 442 transfers the toner image formed on the surface of the photoconductor 41 onto a surface of the intermediate transfer belt 441. Thus, a color toner image is formed on the surface of the intermediate transfer belt 441.

The secondary transfer device 443 transfers the toner image formed on the intermediate transfer belt 441 onto the sheet 9 on the conveying path 300.

It is noted that when the image forming apparatus 10 is a monochromatic image forming apparatus, the secondary transfer device 443 transfers the toner image formed on the photoconductor 41 onto the sheet 9 on the conveying path 300.

The drum cleaning device 45 removes waste toner remaining on the surface of the photoconductor 41. The belt cleaning device 444 removes the waste toner remaining on the intermediate transfer belt 441.

[Fixing Device 5]

The fixing device 5 heats and pressurizes the toner image formed on the sheet 9 while conveying the sheet 9 at the fixing position P2 on the conveying path 300. Thus, the fixing device 5 fixes the toner image onto the sheet 9.

Figure 2:
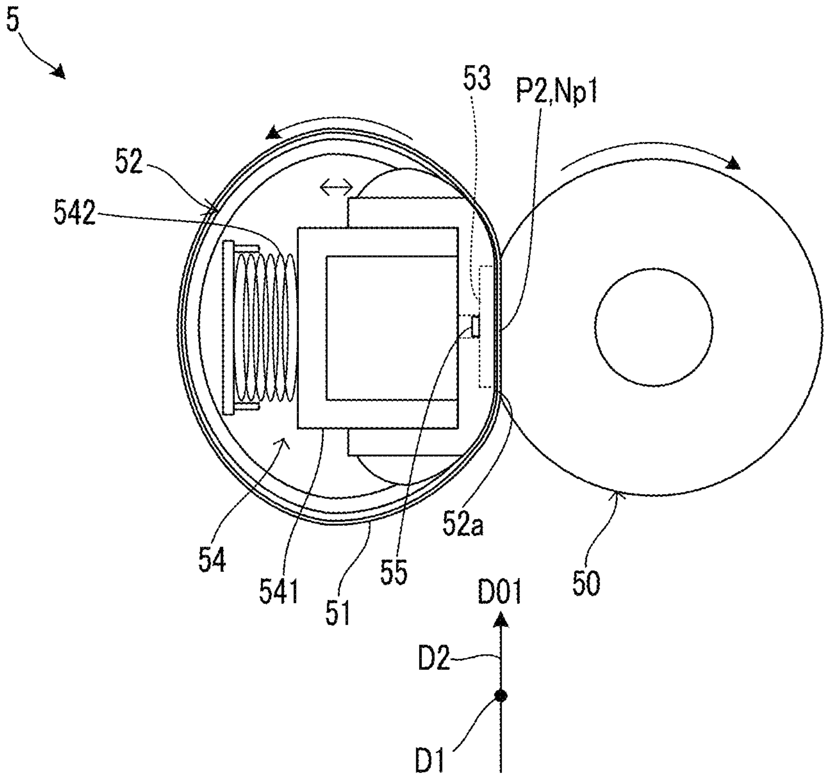
FIG. 2 is a configuration diagram of a fixing device including the heater according to the first embodiment.

As shown in FIG. 2, the fixing device 5 includes a pressure roller 50, a fixing member 51, a support member 52, a heater 53, a bias mechanism 54, and a temperature sensor 55. The pressure roller 50, the fixing member 51, the support member 52, and the heater 53 are each arranged along the main direction D1 at the fixing position P2.

The fixing member 51 is a cylindrical member having flexibility. In other words, the fixing member 51 is an endless belt-type flexible cylinder. For example, the fixing member 51 is a cylindrical film member. The fixing member 51 is rotatably supported by the support member 52.

The pressure roller 50 is brought into pressure contact with the fixing member 51 to thus form a nip Np1 with the fixing member 51. The pressure roller 50 biases the sheet 9 that passes through the fixing position P2 toward the fixing member 51.

The support member 52 rotatably supports the fixing member 51. In addition, the support member 52 supports the heater 53. The support member 52 includes an opposing portion 52*a* that opposes the pressure roller 50 via the fixing member 51. The opposing portion 52*a* is in contact with an inner surface of the fixing member 51.

The heater 53 is incorporated into the opposing portion 52*a*. Thus, the heater 53 is supported by the support member 52 while being provided along the main direction D1. The pressure roller 50, the fixing member 51, and the support member 52 are formed to extend in the main direction D1. The heater 53 is in contact with the inner surface of the fixing member 51.

The bias mechanism 54 includes a pressing member 541 and a spring 542. The spring 542 elastically biases the opposing portion 52*a* toward the pressure roller 50 via the pressing member 541. That is, the bias mechanism 54 elastically biases the fixing member 51 toward the pressure roller 50 via the support member 52.

The pressure roller 50 rotates by being driven by a motor (not shown). The pressure roller 50 causes the fixing member 51 to perform driven rotations. By the driven rotation of the fixing member 51, the inner surface of the fixing member 51 slides with respect to the heater 53 and the opposing portion 52*a*. A lubricant is applied onto the inner surface of the fixing member 51.

The heater 53 heats a portion of the fixing member 51 that forms the nip Np1. The fixing member 51 is heated by the heater 53 while rotating around the support member 52.

The temperature sensor 55 measures a temperature of the heater 53. For example, the temperature sensor 55 is a thermistor.

A detection temperature of the temperature sensor 55 is used in fixing temperature control. The fixing temperature control is feedback control in which the detection temperature of the temperature sensor 55 and a preset target temperature are compared to control power to be supplied to the heater 53.

The temperature sensor 55 measures a temperature that is to become an alternative indicator of a temperature of the portion of the fixing member 51 that forms the nip Np1. Therefore, the temperature sensor 55 may be arranged at a position at which the temperature of the fixing member 51 is to be measured.

[Control Device 8]

The control device 8 executes various types of data processing and control of devices such as the sheet conveying device 3 and the printing device 4. A control target of the control device 8 includes the fixing device 5.

Figure 3:
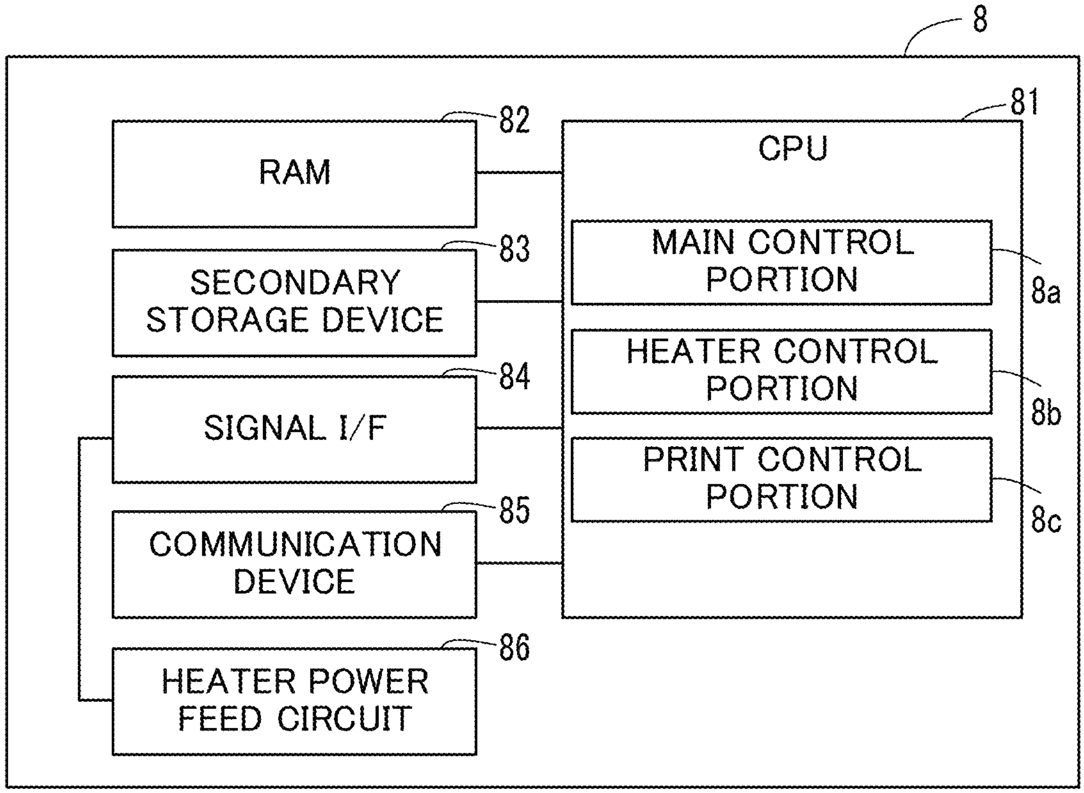
FIG. 3 is a block diagram showing a configuration of a control device in the image forming apparatus.

As shown in FIG. 3, the control device 8 includes a CPU (Central Processing Unit) 81 and peripheral devices. The peripheral devices include a RAM (Random Access Memory) 82, a secondary storage device 83, a signal interface 84, and the like.

In addition, the control device 8 includes a communication device 85 and a heater power feed circuit 86.

The CPU 81 is a processor that executes computer programs to thus execute various types of data processing and control.

The RAM 82 is a volatile computer-readable storage device. The RAM 82 primarily stores the computer programs to be executed by the CPU 81 and data to be output and referenced by the CPU 81 during the process of executing various types of processing.

The CPU 81 includes a plurality of processing modules that are realized by executing the computer programs. The plurality of processing modules include a main control portion 8*a*, a heater control portion 8*b*, a print control portion 8*c*, and the like.

The main control portion 8*a* executes start control to start various types of processing according to operations with respect to an operation device (not shown), and the like.

The heater control portion 8*b* controls a power feed amount to the heater 53 by the fixing temperature control. The heater control portion 8*b* controls the heater power feed circuit 86 to adjust the power feed amount to the heater 53.

The heater power feed circuit 86 supplies power that is based on a power feed instruction from the heater control portion 8*b* to the heater 53.

The print control portion 8*c* controls the sheet conveying device 3. In addition, the print control portion 8*c* causes the printing device 4 to execute the print processing in sync with the conveyance of the sheet 9 by the sheet conveying device 3.

The secondary storage device 83 is a nonvolatile computer-readable storage device. For example, one or both of a flash memory and a hard disk drive is/are adopted as the secondary storage device 83.

The signal interface 84 converts signals output from various sensors such as the temperature sensor 55 into digital data and transmits the digital data to the CPU 81. In addition, the signal interface 84 converts a control instruction output from the CPU 81 into control signals and transmits the control signals to a device to be controlled.

The communication device 85 executes communication with other apparatuses such as a host apparatus that transmits a print job to the image forming apparatus 10. The CPU 81 communicates with the other apparatuses via the communication device 85.

Figure 4:
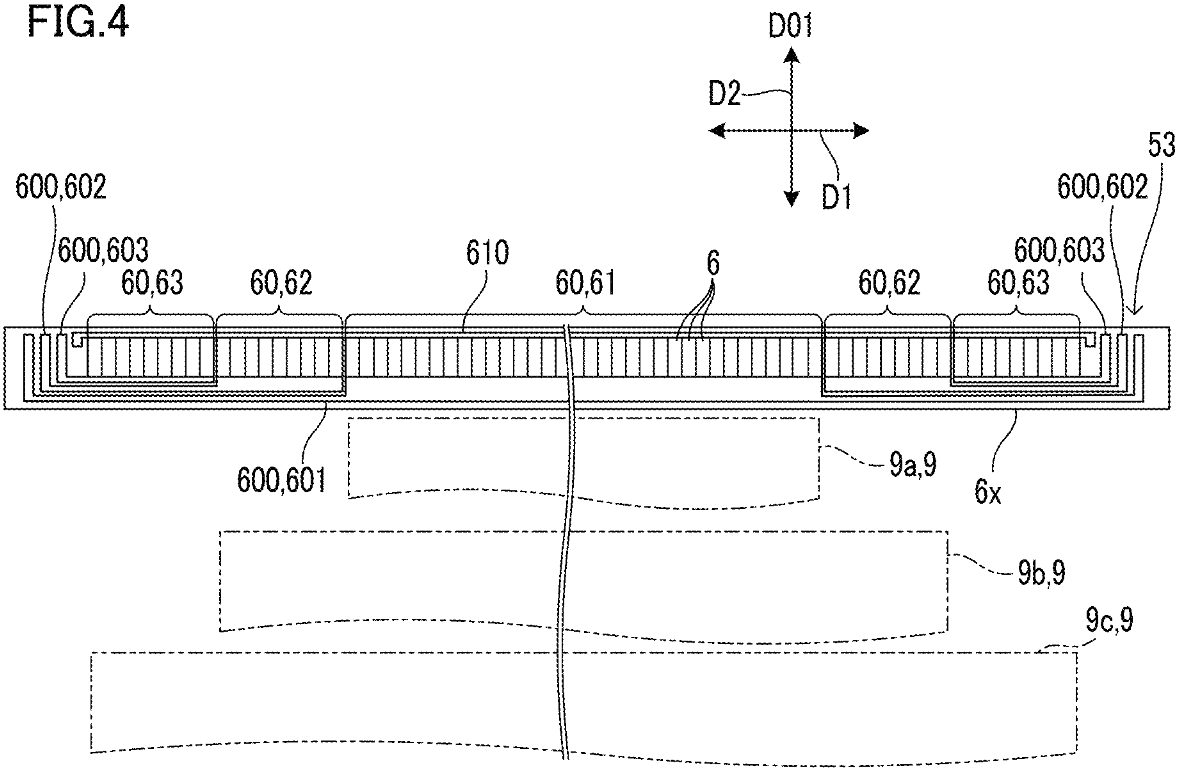
FIG. 4 is a configuration diagram of the heater according to the first embodiment.

In the present embodiment, the heater 53 is a planar heater that includes a plurality of resistance elements 6 (see FIG. 4).

The heater 53 includes a base material 6*x*, a plurality of resistance blocks 60, a plurality of power feed electrodes 600, and a ground electrode 610 (see FIG. 4).

The base material 6*x* is a non-conductive film. The plurality of resistance blocks 60, the plurality of power feed electrodes 600, and the ground electrode 610 are formed on the base material 6*x*.

The plurality of resistance blocks 60 each include the plurality of resistance elements 6 arranged with intervals provided therebetween in the main direction D1. Each of the resistance elements 6 is a heating element that generates heat by being supplied with power.

In descriptions below, a direction along the conveying direction D01 will be referred to as a sub direction D2. The sub direction D2 is a direction that intersects with the main direction D1. The main direction D1 is a longitudinal direction of the heater 53. The sub direction D2 is a short direction of the heater 53.

The plurality of power feed electrodes 600 are respectively connected to one ends of the plurality of resistance blocks 60 in the sub direction D2. In other words, each of the power feed electrodes 600 is connected to a first end of the plurality of resistance elements 6 of the corresponding resistance block 60 in the sub direction D2.

The ground electrode 610 is connected to the other end of the plurality of resistance blocks 60 in the sub direction D2. In other words, the ground electrode 610 is connected to a second end of all of the resistance elements 6 of the heater 53 in the sub direction D2.

The plurality of power feed electrodes 600 are formed in correspondence with the plurality of resistance blocks 60. The plurality of power feed electrodes 600 are capable of individually supplying power to the plurality of resistance blocks 60, respectively.

Figure 5:
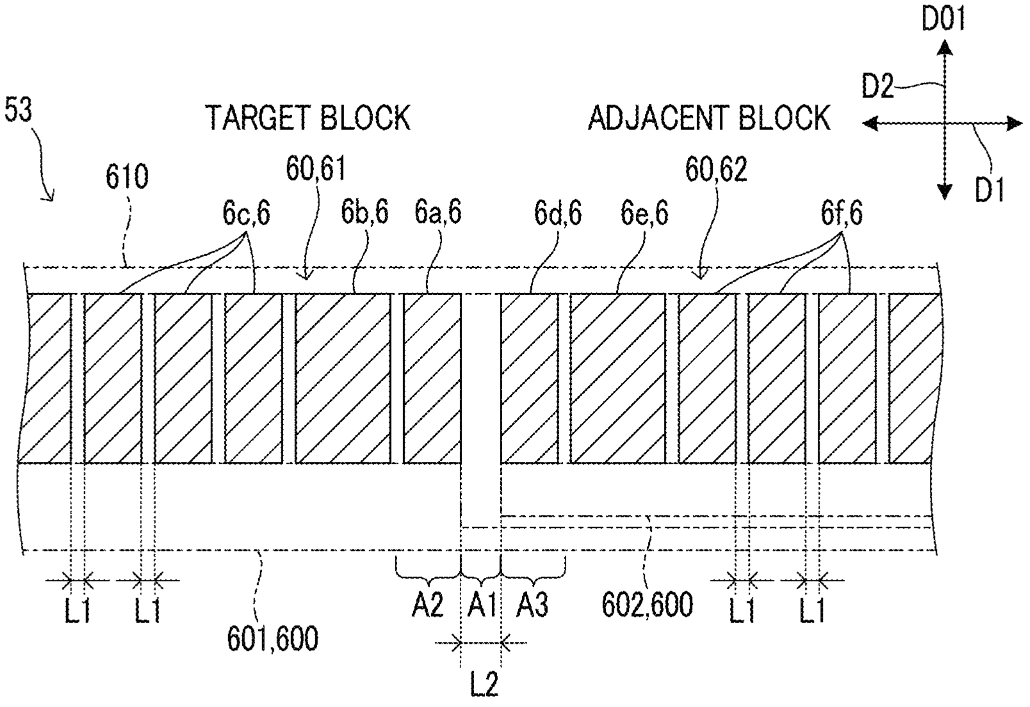
FIG. 5 is a configuration diagram of two adjacent resistance blocks in the heater according to the first embodiment.

The plurality of resistance elements 6 in each of the resistance blocks 60 are arranged at first intervals L1 in the main direction D1 (see FIG. 5). In addition, the plurality of resistance blocks 60 are arranged at second intervals L2 in the main direction D1. The second interval L2 is larger than the first interval L1.

The first interval L1 is an interval requisite for preventing a current from leaking in regions among the plurality of resistance elements 6. The second interval L2 is an interval requisite for preventing a current from leaking in a boundary region A1 between the plurality of resistance blocks 60 (see FIG. 5).

Meanwhile, at a portion of the fixing member 51 that corresponds to the boundary region, there is a fear that a heating amount will become insufficient and thus a temperature requisite for fixing the toner image will not be maintained.

Figure 11:
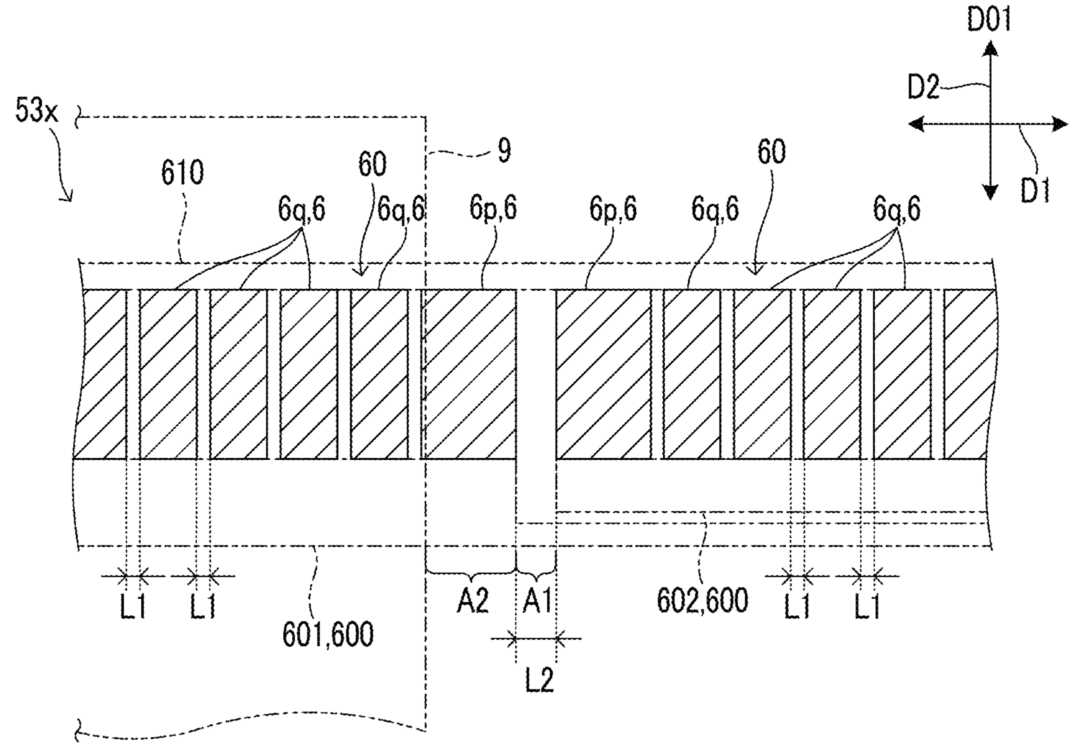
FIG. 11 is a configuration diagram of two adjacent resistance blocks in a heater according to a reference example.

FIG. 11 shows a configuration of the two adjacent resistance blocks 60 in a heater 53*x* according to a reference example.

In each of the plurality of resistance blocks 60 of the heater 53*x*, a resistance element 6*p* that is adjacent to the boundary region A1 and is positioned at an end in the main direction D1 has a larger heat generation amount than other resistance elements 6*q* (see FIG. 11). By adopting the heater 53*x*, a situation where the heating amount becomes insufficient at a portion of the fixing member 51 that comes into contact with the boundary region A1 is avoided.

Incidentally, in the heater 53 of the fixing device 5, the lengths of the plurality of resistance blocks 60 in the main direction D1 are set according to a plurality of candidates of the size of the sheet 9 that passes through the fixing position P2.

Further, the heater control portion 8*b* executes block selection control. In the block selection control, the heater control portion 8*b* selects, from the plurality of resistance blocks 60, one or a plurality of operation blocks in accordance with the size of the sheet 9. In addition, the heater control portion 8*b* controls the heater power feed circuit 86 so that power is supplied to the selected operation block(s).

For example, the heater control portion 8*b* acquires sheet size information when the print processing is executed and selects the operation block in accordance with the sheet size information. For example, the sheet size information includes information on standard sizes of the sheet 9 and information on an orientation of the sheet 9.

However, the sheet 9 may not pass through an end portion A2 of the operation block in the main direction D1 due to variations in the size or conveying position of the sheet 9 (see FIG. 11). When the heat generation amount of the specific resistance element 6*p* positioned at the end portion A2 of the operation block is large, there is a fear that a temperature of a portion of the fixing member 51 that corresponds to the end portion A2 of the operation block will exceed an allowable temperature range TR1 (see FIG. 12).

Figure 12:
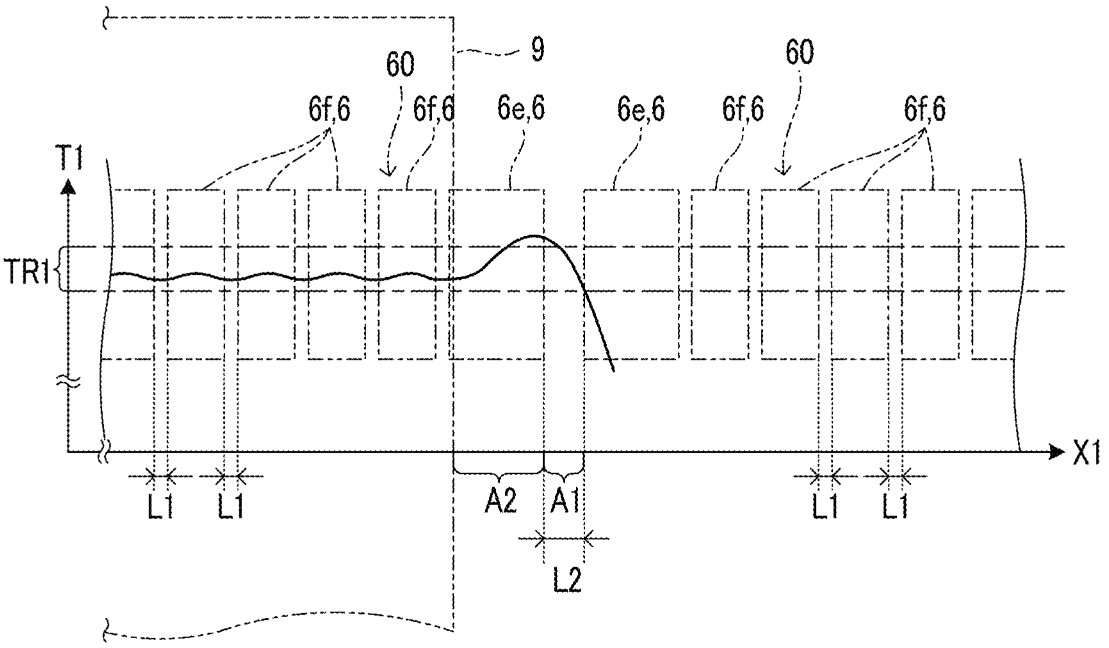
FIG. 12 is a graph showing a reference example of the fixing temperature distribution.

FIG. 12 shows a reference example of a distribution of a fixing temperature T1. The fixing temperature T1 is a temperature of the fixing member 51. The reference example is an example of a case where the fixing member 51 is heated by the heater 53*x*. In FIG. 12, the allowable temperature range TR1 is an allowable range of the fixing temperature T1.

A lower limit temperature of the allowable temperature range TR1 is set based on a temperature requisite for fixing the toner image. The lower limit temperature of the allowable temperature range TR1 is set according to durability required for the fixing member 51.

The reference example is an example of a case where a width of the sheet 9 is slightly smaller than that of an original standard size. In this case, a part or all of the resistance element 6*p* positioned at the end portion A2 of the operation block is outside a passing range of the sheet 9.

In the reference example, the end portion A2 of the operation block is a region where a heat radiation amount from the fixing member 51 to the sheet 9 is small. Therefore, when the heat generation amount of the resistance element 6*p* positioned at the end is large, there is a fear that the temperature of the portion of the fixing member 51 that corresponds to the end portion A2 of the operation block will exceed the allowable temperature range TR1 (see FIG. 12).

On the other hand, the heater 53 has a configuration for avoiding a situation where a temperature of a part of the fixing member 51 becomes an inappropriate temperature due to variations in the size or conveying position of the sheet 9. Hereinafter, that configuration will be described.

In the heater 53, the lengths of the resistance blocks 60 in the main direction D1 are set according to the plurality of candidates of the size of the sheet 9 that passes through the fixing position P2.

For example, the heater 53 includes one first resistance block 61, a pair of second resistance blocks 62, and a pair of third resistance blocks 63 (see FIG. 4). The pair of second resistance blocks 62 are arranged on both outer sides of the first resistance block 61 in the main direction D1. The pair of third resistance blocks 63 are arranged on both outer sides of the pair of second resistance blocks 62 in the main direction D1.

The first resistance block 61 is formed to have a length corresponding to a size of a first sheet 9*a* in the main direction D1.

A length obtained by adding the pair of second resistance blocks 62 and the first resistance block 61 is formed to be a length corresponding to a size of a second sheet 9*b* in the main direction D1. The size of the second sheet 9*b* in the main direction D1 is larger than that of the first sheet 9*a*.

A length obtained by adding the pair of third resistance blocks 63, the pair of second resistance blocks 62, and the first resistance block 61 is formed to be a length corresponding to a size of a third sheet 9*c* in the main direction D1. The size of the third sheet 9*c* in the main direction D1 is larger than that of the second sheet 9*b*.

The sizes of the first sheet 9*a*, the second sheet 9*b*, and the third sheet 9*c* are each an example of a predetermined standard size. In other words, the plurality of resistance blocks 60 of the heater 53 are formed to have lengths corresponding to the plurality of standard sizes of the sheet 9. The standard sizes corresponding to the first sheet 9*a*, the second sheet 9*b*, and the third sheet 9*c* are an example of the plurality of candidates of the size of the sheet 9 that passes through the fixing position P2.

When the size indicated by the sheet size information is equal to or smaller than the size of the first sheet 9*a*, the heater control portion 8*b* selects the first resistance block 61 as the operation block.

Alternatively, when the size indicated by the sheet size information is equal to or larger than the size of the second sheet 9*b* and smaller than the size of the third sheet 9*c*, the heater control portion 8*b* selects the first resistance block 61 and the pair of second resistance blocks 62 as the operation blocks.

Alternatively, when the size indicated by the sheet size information is larger than the size of the second sheet 9*b*, the heater control portion 8*b* selects the first resistance block 61, the pair of second resistance blocks 62, and the pair of third resistance blocks 63 as the operation blocks.

In the block selection control, the heater control portion 8*b* executes control to supply power to the one or plurality of operation blocks that has/have been selected.

In the heater 53, the plurality of resistance blocks 60 include one or more target blocks and an adjacent block provided next to the target block.

In the present embodiment, the first resistance block 61 and the pair of second resistance blocks 62 are the target blocks.

When the first resistance block 61 is assumed to be the target block, each of the pair of second resistance blocks 62 is the adjacent block.

Further, when one of the pair of second resistance blocks 62 is assumed to be the target block, one of the pair of third resistance blocks 63 is the adjacent block.

In FIG. 5, the first resistance block 61 is indicated as the target block, and one of the pair of second resistance blocks 62 is indicated as the adjacent block.

The plurality of resistance elements 6 of the target block include a first end portion resistance element 6*a*, a first target resistance element 6*b*, and a plurality of first internal resistance elements 6*c* (see FIG. 5).

The first end portion resistance element 6*a* is positioned at the end portion A2 of the target block on the adjacent block side. The first target resistance element 6*b* is positioned next to the first end portion resistance element 6*a*.

The plurality of first internal resistance elements 6*c* are arrayed on an opposite side of the end portion A2 side with respect to the first target resistance element 6*b* in the target block.

The size of the end portion A2 of the target block in the main direction D1 is determined in accordance with a magnitude of the variations in the size or variations in the conveying position regarding the sheet 9 of the corresponding standard size.

In the present embodiment, the end portion A2 of the target block in the main direction D1 includes one first end portion resistance element 6*a*. Accordingly, the first target resistance element 6*b* is positioned second from the end on the adjacent block side out of the plurality of resistance elements 6 of the target block.

When power is supplied to the target block, the heat generation amount of the first target resistance element 6*b* is larger than the heat generation amount of the one first end portion resistance element 6*a*. Further, the heat generation amount of the first target resistance element 6*b* is larger than the heat generation amount of each of the first internal resistance elements 6*c*.

In the present embodiment, the heat generation amount of the first end portion resistance element 6*a* is the same as the heat generation amount of each of the first internal resistance elements 6*c*. It is noted that the heat generation amount of the first end portion resistance element 6*a* may be smaller than the heat generation amount of each of the first internal resistance elements 6*c*.

It is noted that in FIG. 5 to FIG. 12, a magnitude relationship among the widths of the plurality of resistance elements 6 represent a magnitude relationship among the heat generation amounts of the plurality of resistance elements 6. However, in FIG. 5 to FIG. 12, a ratio of the widths of the plurality of resistance elements 6 is irrelevant to a ratio of the heat generation amounts of the plurality of resistance elements 6.

In the present embodiment, the plurality of resistance elements 6 of the adjacent block include a second end portion resistance element 6*d*, a second target resistance element 6*e*, and a plurality of second internal resistance elements 6*f* (see FIG. 5).

The second end portion resistance element 6*d* is positioned at an end portion A3 of the adjacent block on the target block side. For example, the size of the end portion A3 of the adjacent block is the same as the size of the end portion A2 of the target block.

In the present embodiment, the end portion A3 of the adjacent block in the main direction D1 includes one second end portion resistance element 6*d*. Accordingly, the second target resistance element 6*e* is positioned second from the end on the target block side out of the plurality of resistance elements 6 of the adjacent block.

When power is supplied to the adjacent block, the heat generation amount of the second target resistance element 6*e* is larger than the heat generation amount of the second end portion resistance element 6*d*. Further, the heat generation amount of the second target resistance element 6*e* is larger than the heat generation amount of each of the second internal resistance elements 6*f*.

In the present embodiment, the heat generation amount of the second end portion resistance element 6*d* is the same as the heat generation amount of each of the second internal resistance elements 6*f*. It is noted that the heat generation amount of the second end portion resistance element 6*d* may be smaller than the heat generation amount of each of the second internal resistance elements 6*f*.

Figure 6:
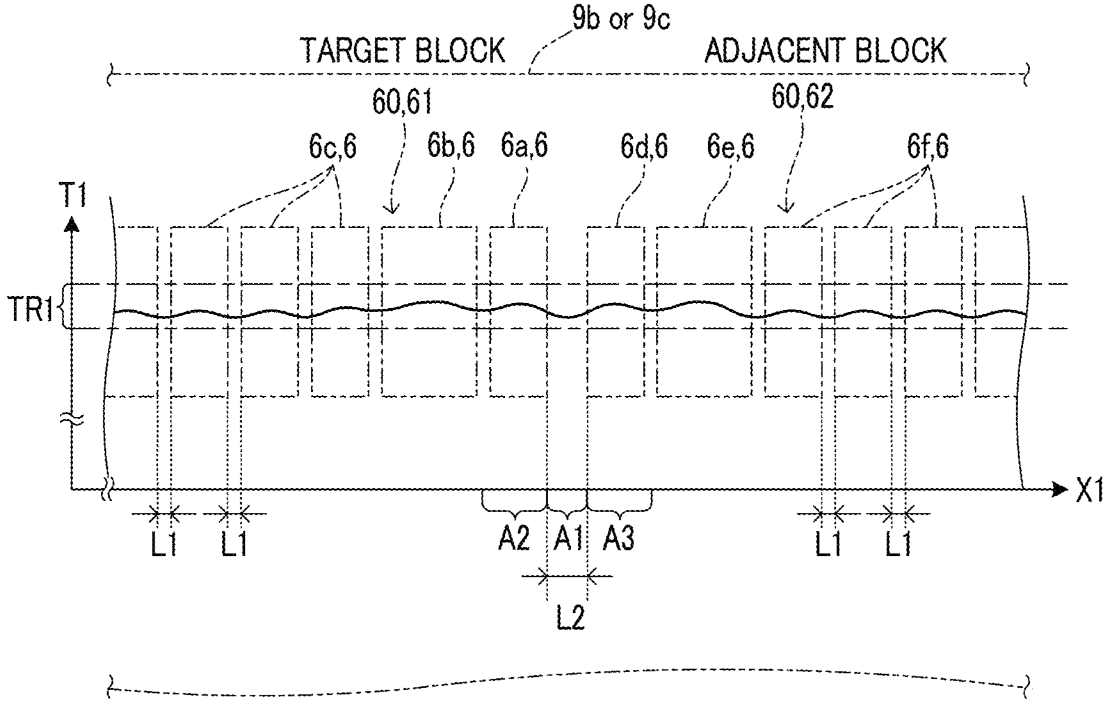
FIG. 6 is a graph showing a first example of a fixing temperature distribution.
Figure 7:
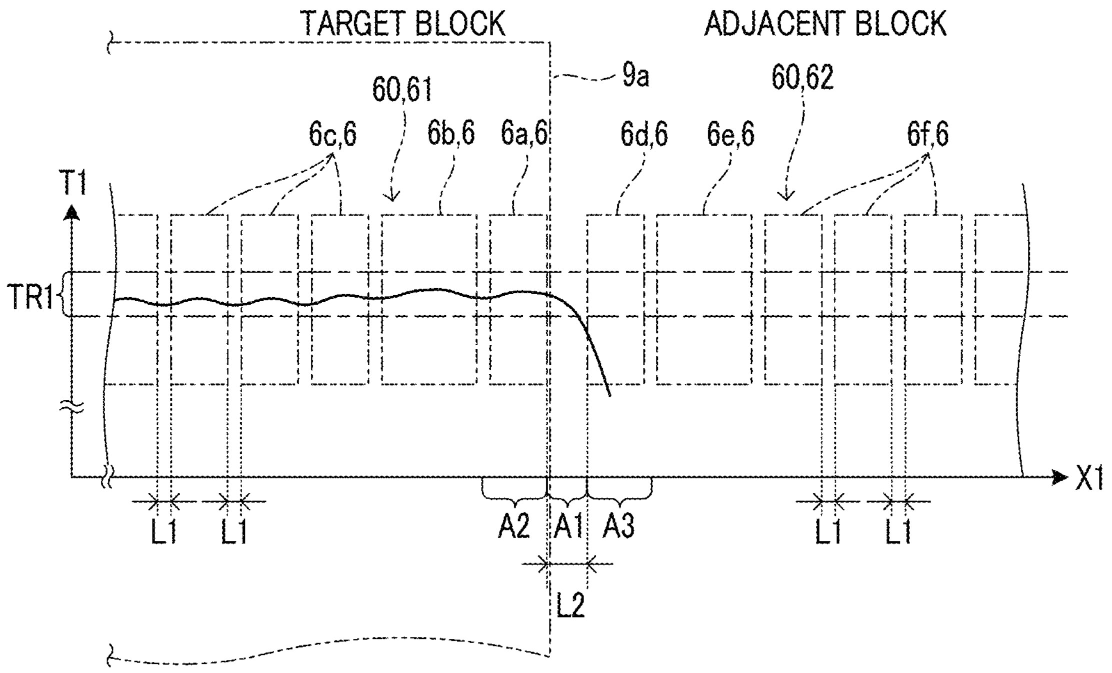
FIG. 7 is a graph showing a second example of the fixing temperature distribution.
Figure 8:
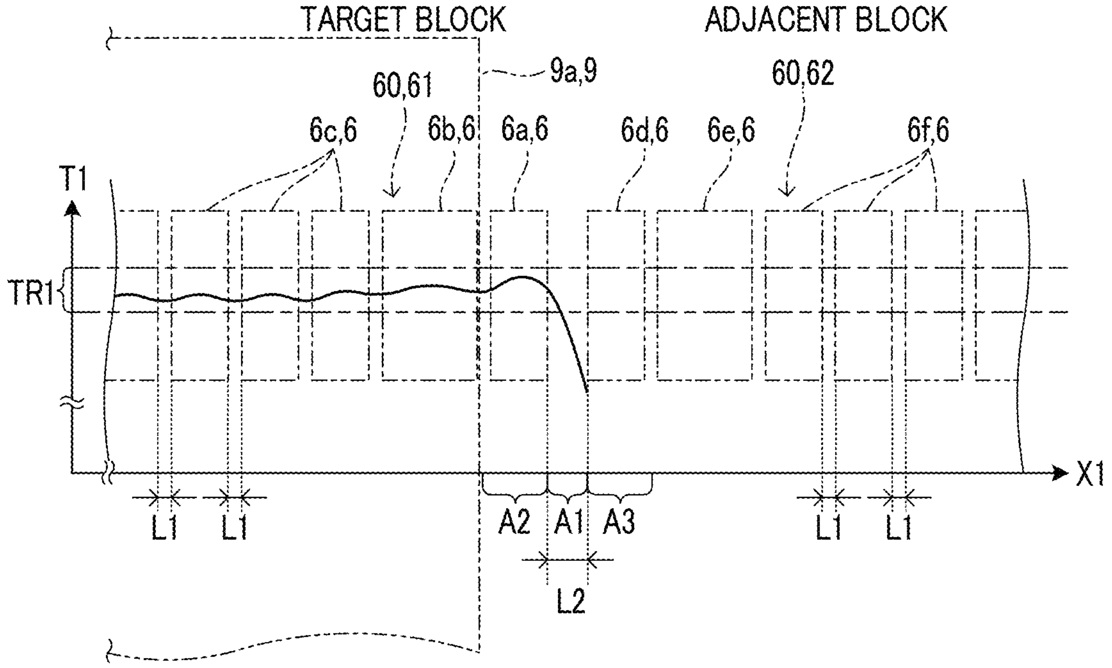
FIG. 8 is a graph showing a third example of the fixing temperature distribution.

FIG. 6 to FIG. 8 each show an example of a distribution of the fixing temperature T1 in the fixing device 5 including the heater 53. The fixing temperature T1 is the temperature of the fixing member 51. FIG. 6 to FIG. 8 each show the distribution of the fixing temperature T1 in a region ranging from a part of the first resistance block 61 to a part of the one of the pair of second resistance blocks 62.

In FIG. 6 to FIG. 8, the abscissa axis in the graph represents the position in the main direction D1 in the fixing member 51, and the ordinate axis in the graph represents the fixing temperature T1.

In FIG. 6 to FIG. 8, the target block is the first resistance block 61, and the adjacent block is one of the pair of second resistance blocks 62.

FIG. 6 shows a first example of the distribution of the fixing temperature T1. The first example is an example where the second sheet 9*b* or the third sheet 9*c* passes through the fixing position P2.

In the first example, both of the target block and the adjacent block are the operation blocks.

The fixing temperature T1 of the first example falls within the allowable temperature range TR1 in the boundary region A1 between the target block and the adjacent block. This is because the heat generation by the first target resistance element 6*b* and the second target resistance element 6*e* affects the boundary region A1.

Further, in regions corresponding to the first target resistance element 6*b* and the second target resistance element 6*e*, the fixing temperature T1 of the first example is slightly higher than the temperatures of other regions.

However, the fixing temperature T1 of the first example falls within the allowable temperature range TR1 across the entire region including both of the target block and the adjacent block.

FIG. 7 shows a second example of the distribution of the fixing temperature T1. The second example is an example where the first sheet 9*a* having a relatively large width passes through the fixing position P2.

In the second example, the target block is the operation block, and power is not supplied to the adjacent block. In the second example, the first sheet 9*a* passes through a region provided across the entire target block.

The fixing temperature T1 of the second example generally shows a distribution similar to that of the fixing temperature T1 of the first example in the region corresponding to the target block.

Accordingly, the fixing temperature T1 of the second example falls within the allowable temperature range TR1 in the region corresponding to the target block.

FIG. 8 shows a third example of the distribution of the fixing temperature T1. The third example is an example where the first sheet 9*a* having a relatively small width passes through the fixing position P2. A difference between the second example and the third example is due to the variations in the size of the first sheet 9*a* which is the standard size.

In the third example, the target block is the operation block, and power is not supplied to the adjacent block.

In the third example, the first sheet 9*a* passes through a region corresponding to portions other than the end portion A2 of the target block. In other words, in the third example, the first sheet 9*a* does not pass through a region corresponding to the end portion A2 of the target block.

The fixing temperature T1 of the third example generally shows a distribution similar to that of the fixing temperature T1 of the first example and the second example in a region corresponding to portions other than the first end portion resistance element 6*a* in the target block.

On the other hand, in a region corresponding to the first end portion resistance element 6*a* in the target block, the fixing temperature T1 of the third example is slightly higher than the temperatures of other regions. This is because the heat radiation amount from the fixing member 51 to the sheet 9 is small in the region corresponding to the end portion A2 of the target block.

However, since the heat generation amount of the first end portion resistance element 6*a* is not large, the fixing temperature T1 of the third example falls within the allowable temperature range TR1 in the region corresponding to the target block. This point is different from the example of FIG. 12 in which the heater 53*x* according to the reference example is adopted.

By adopting the heater 53 in the fixing device 5, a situation where the temperature of a part of the fixing member 51 becomes an inappropriate temperature due to the variations in the size or conveying position of the sheet 9 is avoided.

The configuration of the first end portion resistance element 6*a*, the first target resistance element 6*b*, and the plurality of first internal resistance elements 6*c* is a first main configuration of the present embodiment. Further, the configuration of the second end portion resistance element 6*d*, the second target resistance element 6*e*, and the plurality of second internal resistance elements 6*f* is a second main configuration of the present embodiment.

The first main configuration and the second main configuration of the present embodiment are also adopted in regions where the pair of second resistance blocks 62 and the pair of third resistance blocks 63 are arranged adjacent to one another in the heater 53.

Second Embodiment

Next, a heater 53A according to a second embodiment will be described with reference to FIG. 9.

Figure 9:
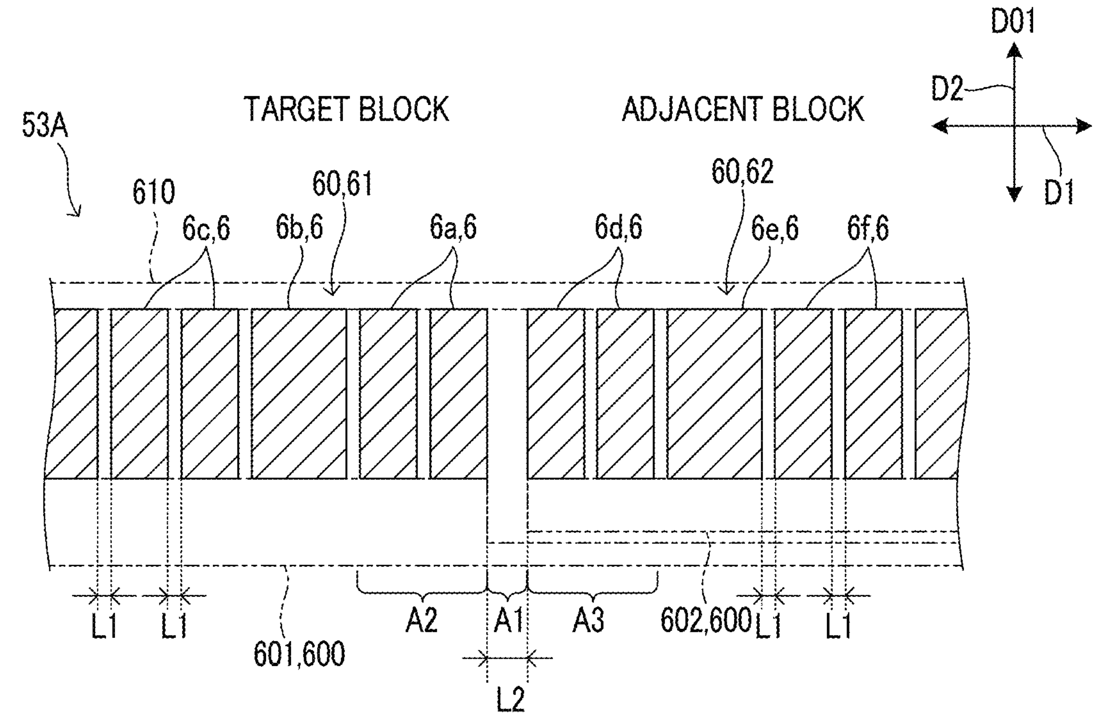
FIG. 9 is a configuration diagram of two adjacent resistance blocks in a heater according to a second embodiment.

In FIG. 9, constituent elements that are the same as the constituent elements shown in FIG. 4 to FIG. 8 are denoted by the same reference symbols. The heater 53A configures a part of the fixing device 5 in place of the heater 53.

In the present embodiment, the first resistance block 61 and the pair of second resistance blocks 62 are the target blocks.

When the first resistance block 61 is assumed to be the target block, each of the pair of second resistance blocks 62 is the adjacent block.

Further, when one of the pair of second resistance blocks 62 is assumed to be the target block, one of the pair of third resistance blocks 63 is the adjacent block.

In FIG. 9, the first resistance block 61 is indicated as the target block, and one of the pair of second resistance blocks 62 is indicated as the adjacent block.

In the heater 53A, the plurality of resistance elements 6 of the target block include two first end portion resistance elements 6*a*, the first target resistance element 6*b*, and the plurality of first internal resistance elements 6*c* (see FIG. 9). The first target resistance element 6*b* is positioned next to the two first end portion resistance elements 6*a*.

When power is supplied to the target block, the heat generation amount of the first target resistance element 6*b* is larger than the heat generation amount of each of the two first end portion resistance elements 6*a*. Further, the heat generation amount of the first target resistance element 6*b* is larger than the heat generation amount of each of the first internal resistance elements 6*c*.

In the present embodiment, the end portion A2 of the target block in the main direction D1 includes the two first end portion resistance elements 6*a*. Accordingly, the first target resistance element 6*b* is positioned third from the end on the adjacent block side out of the plurality of resistance elements 6 of the target block.

Further in the heater 53A, the plurality of resistance elements 6 of the adjacent block include two second end portion resistance elements 6*d*, the second target resistance element 6*e*, and the plurality of second internal resistance elements 6*f* (see FIG. 9).

For example, the heater 53A is adopted in a case where the variations in the size or conveying position of the sheet 9 are larger than those of the case where the heater 53 is adopted.

Alternatively, the heater 53A may be adopted in a case where the sizes of the first target resistance element 6*b* and the plurality of first internal resistance elements 6*c* in the main direction D1 are smaller than those of the heater 53.

Also when the heater 53A is adopted, effects similar to those of the case where the heater 53 is adopted can be obtained.

It is noted that the end portion A2 of the target block in the main direction D1 may include three or more first end portion resistance elements 6*a*.

Third Embodiment

Next, a heater 53B according to a third embodiment will be described with reference to FIG. 10.

Figure 10:
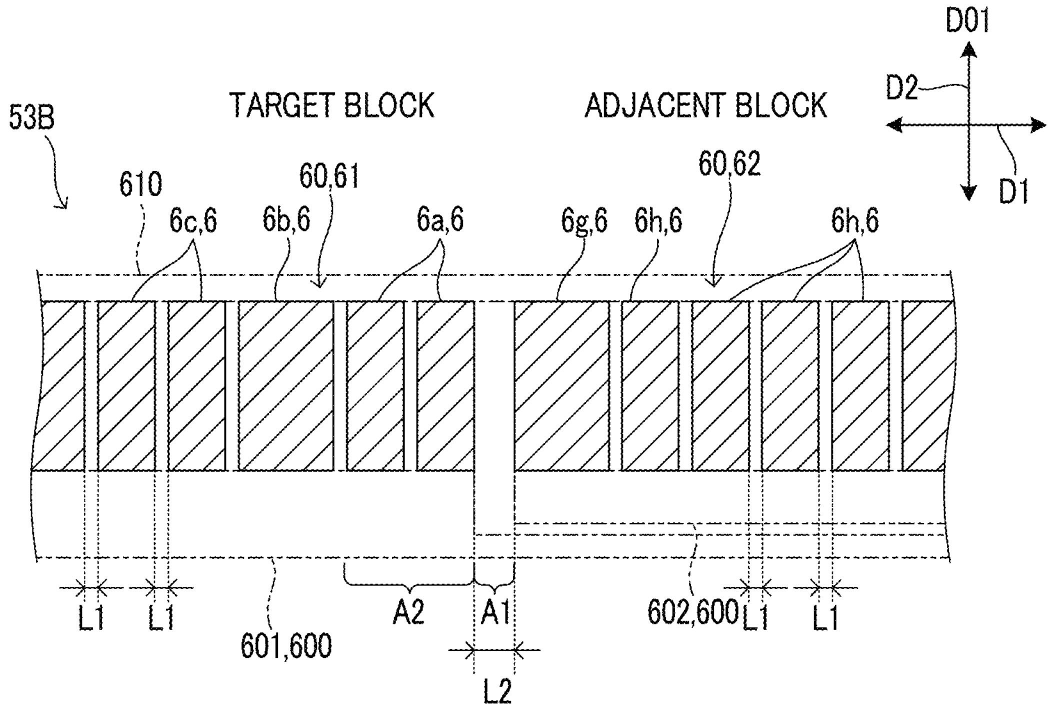
FIG. 10 is a configuration diagram of two adjacent resistance blocks in a heater according to a third embodiment.

In FIG. 10, constituent elements that are the same as the constituent elements shown in FIG. 4 to FIG. 8 are denoted by the same reference symbols. The heater 53B configures a part of the fixing device 5 in place of the heater 53.

In the present embodiment, the first resistance block 61 and the pair of second resistance blocks 62 are the target blocks.

When the first resistance block 61 is assumed to be the target block, each of the pair of second resistance blocks 62 is the adjacent block.

Further, when one of the pair of second resistance blocks 62 is assumed to be the target block, one of the pair of third resistance blocks 63 is the adjacent block.

In FIG. 10, the first resistance block 61 is indicated as the target block, and one of the pair of second resistance blocks 62 is indicated as the adjacent block.

In the heater 53B, the plurality of resistance elements 6 of the target block include the two first end portion resistance elements 6*a*, the first target resistance element 6*b*, and the plurality of first internal resistance elements 6*c* (see FIG. 10). This configuration is the same as that of the heater 53A.

Further in the heater 53B, the plurality of resistance elements 6 of the adjacent block include one third end portion resistance element 6*g* and a plurality of third internal resistance elements 6*h* (see FIG. 10).

The third end portion resistance element 6*g* is one of the plurality of resistance elements 6 of the adjacent block that is positioned at the end on the target block side. The plurality of third internal resistance elements 6*h* are formed to be arranged from the position next to the third end portion resistance element 6*g* in the adjacent block.

When power is supplied to the adjacent block, the heat generation amount of the third end portion resistance element 6*g* is larger than the heat generation amount of each of the plurality of third internal resistance elements 6*h*.

By executing the block selection control, power is not supplied to the adjacent block when the sheet 9 does not pass through the region of the adjacent block. In addition, the variations in the size or conveying position of the second sheet 9*b* normally do not affect the presence or absence of the second sheet 9*b* in the region of the third end portion resistance element 6*g*.

Accordingly, also when the heater 53B is adopted, effects similar to those of the case where the heater 53 is adopted can be obtained.

It is noted that the configuration of the adjacent block of the heater 53B may be adopted as the adjacent block of the heater 53.

The invention claimed is:

1. A heater, comprising:

a plurality of resistance blocks each including a plurality of resistance elements arranged at a first interval in a main direction; and a plurality of power feed electrodes which are respectively connected to one ends of the plurality of resistance blocks in a sub direction that intersects with the main direction and are capable of individually supplying power to the plurality of resistance blocks, respectively, wherein the plurality of resistance blocks are arrayed at a second interval larger than the first interval in the main direction, the plurality of resistance blocks include:

a first resistance block formed to have a length corresponding to a first sheet size in the main direction; and a pair of second resistance blocks arranged on both outer sides of the first resistance block in the main direction, a length obtained by adding the pair of second resistance blocks and the first resistance block is formed to be a length corresponding to a second sheet size larger than the first sheet size in the main direction, the plurality of resistance elements of the first resistance block include:

one or more first end portion resistance elements positioned at both end portions of the first resistance block in the main direction;

a first target resistance element positioned adjacent to the first end portion resistance elements; and a plurality of first internal resistance elements that are resistance elements other than the first end portion resistance elements and the first target resistance element, and when power is supplied to the first resistance block, a heat generation amount of the first target resistance element is larger than a heat generation amount of each of the one or more first end portion resistance elements and is larger than a heat generation amount of each of the plurality of first internal resistance elements.

2. The heater according to claim 1, wherein the plurality of resistance elements of each of the second resistance blocks include:

one or more second end portion resistance elements positioned at an end portion of the second resistance block on the first resistance block side; and a second target resistance element positioned adjacent to the second end portion resistance elements, and when power is supplied to the second resistance block, a heat generation amount of the second target resistance element is larger than a heat generation amount of each of the one or more second end portion resistance elements.

3. A fixing device which heats and pressurizes a toner image on a sheet at a fixing position on a conveying path of the sheet, to fix the toner image onto the sheet, comprising:

a support member arranged along a main direction that intersects with a sheet conveying direction at the fixing position;

a cylindrical fixing member rotatably supported by the support member; and the heater according to claim 1, wherein the heater is supported by the support member while being provided along the main direction and heats the fixing member.

4. The fixing device according to claim 3, wherein the plurality of resistance blocks of the heater are formed to have lengths corresponding to a plurality of standard sizes of the sheet.

5. An image forming apparatus, comprising:

a transfer device which transfers a toner image onto a sheet; and the fixing device according to claim 3.

* * * * *